(12) United States Patent
Schuberth et al.

(10) Patent No.: US 6,301,954 B1
(45) Date of Patent: Oct. 16, 2001

(54) SEGEMENTED MEASURING PROBE FOR SEWAGE PIPES

(75) Inventors: Harald Schuberth, Breitenguessbach; Martin Kreutzer, Homburg, both of (DE)

(73) Assignee: SeBa-Dynatronic Mess-und Ortungstechnik (DE)

( * ) Notice: Subject to any disclaimer, the term of this patent is extended or adjusted under 35 U.S.C. 154(b) by 0 days.

(21) Appl. No.: 09/339,447

(22) Filed: Jun. 24, 1999

(30) Foreign Application Priority Data

Jun. 23, 1998 (DE) .............................. 198 27 854

(51) Int. Cl.⁷ .............................. G01M 3/16; G01B 27/08
(52) U.S. Cl. .......................... 73/40.5 R; 73/49.1; 73/40; 324/358; 324/718; 340/605
(58) Field of Search ................... 73/40.5 R, 40, 73/49.1; 324/368, 355, 358, 718; 340/605

(56) References Cited

U.S. PATENT DOCUMENTS

| | | | |
|---|---|---|---|
| 4,796,186 | * 1/1989 | Kaufman | 364/422 |
| 4,837,518 | * 6/1989 | Gard et al. | 324/368 |
| 5,043,668 | * 8/1991 | Vail, III | 324/368 |
| 5,323,429 | * 6/1994 | Roarty et al. | 376/249 |
| 5,486,767 | 1/1996 | Schwabe et al. | 324/715 |
| 5,889,467 | * 3/1999 | Marmonier et al. | 340/605 |
| 5,905,194 | * 5/1999 | Strong | 73/40.5 R |
| 5,969,234 | * 10/1999 | Weigele | 73/40.5 R |
| 6,031,381 | * 2/2000 | Vail, III et al. | 324/716 |

FOREIGN PATENT DOCUMENTS

| | | | |
|---|---|---|---|
| 4010622 | 10/1991 | (DE) | G01M/3/40 |
| 4412147 | 10/1995 | (DE) | G01M/3/18 |
| 19612800 | 10/1997 | (DE) | F17D/5/02 |
| 0786653 | 7/1997 | (EP) | G01M/3/18 |

\* cited by examiner

Primary Examiner—Hezron Williams
Assistant Examiner—David J. Wiggins
(74) Attorney, Agent, or Firm—The Maxham Firm

(57) ABSTRACT

A method and apparatus for determining leaks in sewage pipes. The apparatus includes a measuring probe having several radially arranged measuring electrode segments, the measuring probe being positioned in the sewage pipe. With the probe sections and electrode segments being arranged in such radial manner, the electrical probe, once electrically powered, measures a leakage current emitted by the probe's central section with several probes sections at a same electrical potential, and divides the measured leakage currents of the probe's central section in a mathematical operation into two or more electrode segments to determine both an axial and radial location for defects within the sewage pipe. A higher leakage current in one segment indicates the location of a leak, and the amplitude of the leakage current indicates the volume of the leak.

24 Claims, 3 Drawing Sheets

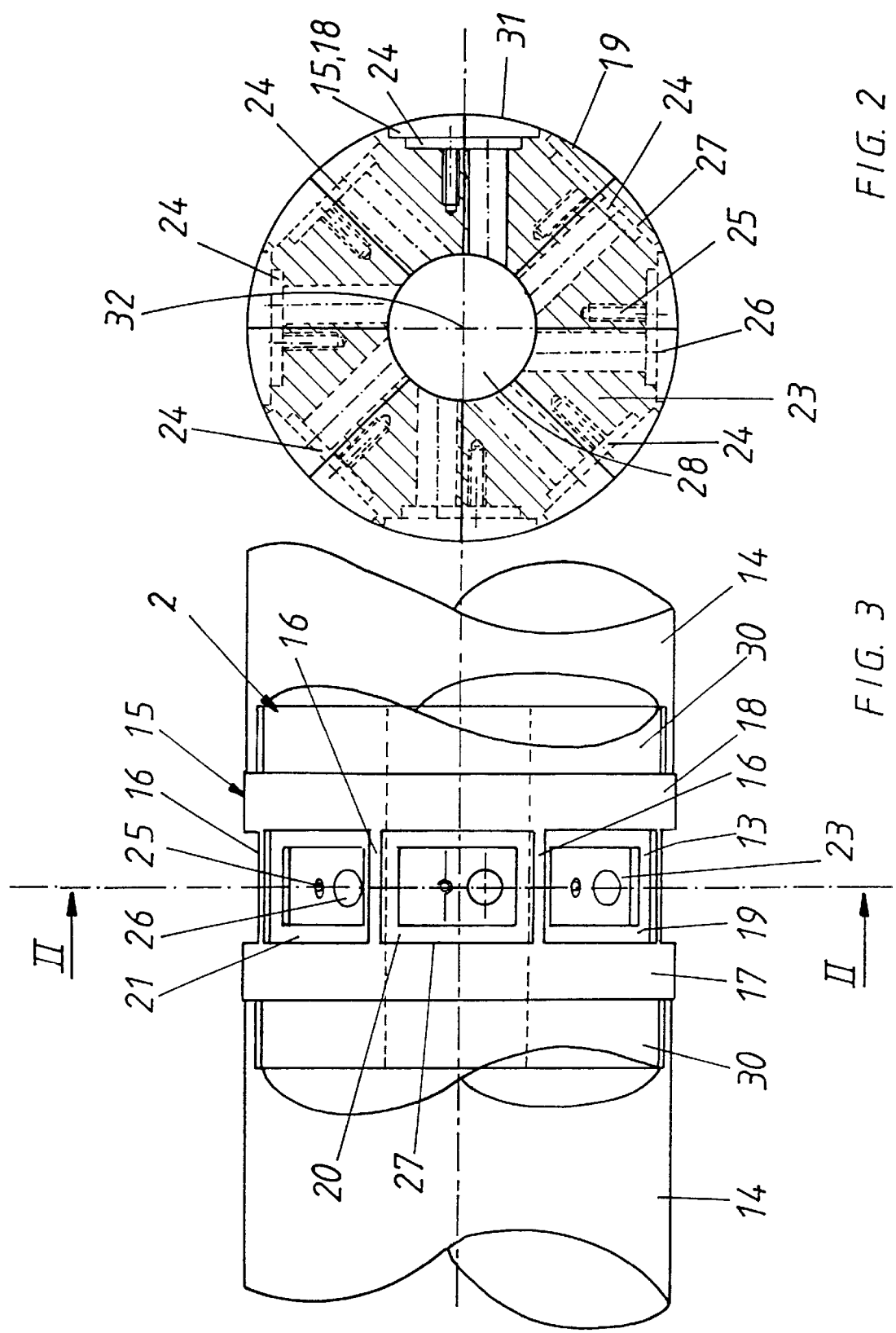

SEGEMENTED MEASURING PROBE FOR SEWAGE PIPES

BACKGROUND

1. Field of the Invention

The invention generally concerns a method and a device for determining leaks in sewage pipes, and more particularly provides a radially segmented sensor device placed inside the pipe where leakage current determines location and volume of a leak.

2. Discussion of Related Art

A method and a device of this general type have become known from European Patent 0 786 653. This known technology involves a method using a measuring probe to determine the location and the size of leaks in sewers and similar conduit systems where a pipe exists which is not too highly conductive electrically and laid in an electrically conductive underground.

Another method and a device of this type are also described in German patent 40 10 611. With this well-known device, a probe, which is designed to move in a longitudinal direction along the pipe, is fed into the sewer. Current paths emanate in all directions from the electrode, but basically extend in the direction of the sewage flow. Once the electrode is moved past a leak in the pipe, the electrical emission near the leak will increase, which can be measured from outside the pipe by an appropriate measuring system. This measuring system basically consists of a voltage source and a current measuring instrument, with the voltage source being grounded by means of a remote ground contact. A leak is characterized by the sewage seeping out into the surrounding soil, causing the flow of current on the electrode to change once this electrode is brought close to the leak.

One disadvantage with the known procedure, however, is that it responds less selectively to a leak of this kind. It is disadvantageous, in fact, that a relatively high current should flow along the sewer over the sewage itself, with the result that this method is not very selective.

With European Patent 0 786 653, a method and a device of the initially specified type was developed so that measurements can be made with substantially greater sensitivity, with the result that even smaller leaks can be determined in sewage pipes and the like. An essential feature is that no longer is a current-emitting electrode simply moved in a sewer, but rather that a measuring probe is moved in the sewer. The measuring probe basically consists of an electrically conductive mount on which at least one current flow sensor is arranged. The mount can be rigidly designed as a rod. It is possible, however, to use a wire spiral or a wire stretched in the pipe. The use of a rod allows it to be designed in one or more parts.

The prior art probe can be used not only to detect leaks in sewers, but in any kind of pipe system which assumes that an electrically conductive medium is guided in the conduit of pipes and the conduit itself is not too highly conductive (metallically), so that the current flow in the leak-free pipe wall is not too high in the direction of the surrounding earth.

Accordingly, the probe is not merely limited to pipes in sewers, but could also be used for detecting leaks with other conductive media in pipe conduits of corresponding conductivity. It is based on the effect of moving a conductive metal rod or metal-coated plastic rod or the like in a longitudinal direction inside a pipe, whereby a centric arrangement of the probe in the pipe is not inevitably assumed, but rather the probe could also be moved eccentrically in the pipe in a longitudinal direction.

It is also possible for several probes to be moved radially on the inside of the pipe wall on an equally appropriate mount. This would enable the radial position of the leak to be determined in addition to determining the axial position.

The measuring probes may consist of simple, current emitting electrodes whose discharge longitudinally, compared with the ratios in German patent 40 10 622, is now reduced by the factor 1/n (n=number of measuring probes). This arrangement signifies a very considerable improvement in the resolution vis-a-vis the above German patent.

One embodiment of the prior art probe consists of a conductive rod, on which two current sensors are arranged at a distance from each other, and the rod is connected on one side to a voltage source. The voltage source is connected in turn between the rod and a remote ground. The flow of current through the two current sensors is recorded and transmitted via a cable to the outside of the pipe, where a corresponding measuring system is arranged on the earth's surface.

The applicable principles of operation and structure of the known devices are set out below. If one introduces a conductive metal rod, supplied with a current, axially into a pipe filled with conductive fluid, then lines of current will extend from the surface of the metal rod through this fluid in the direction of the pipe wall. It has already been explained on the basis of the current state of the art that unwanted longitudinal currents may arise if no precautions are taken to achieve a focusing of the lines of current.

With European patent 0 786 653, a focusing of the lines of current at the probe was achieved by various devices through extending the relevant lines of current normally toward the wall of the pipe. These lines of current are of particular interest because they are highly sensitive to any change in the conductivity in the pipe wall, especially where a leak is found.

Hence, a method and a device were developed with which the lines of current which are normally found toward the pipe wall can be evaluated selectively while the other lines of current which extend at an angle or even longitudinally to the medium can be blanked out.

Provision was made for two current sensors to be arranged at a distance on a conductive metal rod and that these current sensors should each consist of a toroid core, which is enclosed in a winding, with the winding's connections leading outwardly. This involves a Rogowski coil. Any known current sensors can be used that are suitable for measuring relatively small currents within the range of few milliamperes.

What is important is that, if one takes the difference between the flow of current through one current sensor and the flow of current through the other sensor, a measuring current, or rather leakage current, is obtained which contains the information about the location of the leak. The size of the measuring current caused by the leak provides the information on the extent of the leak as long as the magnitude of the measured leakage current remains smaller than the known value of the fault current for one path through the pipe wall.

The probe is actually divided in three and consists of a rear section, a central section and a front section. The tripartite division is achieved in the first embodiment by the probe being constructed as a continuous metal rod, with the central section being defined, however, by the space that results from the two current sensors being arranged at a distance from each other. The central section is the sensor section, therefore. The current that is emitted here in the direction of the pipe wall is measured. The two outer parts of the probe only have the task of ensuring that the current of the central section flows in the direction of the pipe wall. This occurs through all three sections of the probe lying at the same potential plane, whereby all three sections in the first design example consist of a continuous metal rod or an equivalent plastic component which is metal-coated.

The requirement for the measurement is that the two current sensors should be constructed identically to allow them to make a statement as to the differential current.

In a further development the plan was to use only one current sensor, but through which two currents are passed, in order to obtain a difference between two currents. Here the measurement of the second current is not obtained by a second sensor arranged away from the first sensor, but rather by carrying out a mechanical separation in the continuous metal probe and connecting a lead to both the front of one of the adjoining probe sections and to the front of the other near the point of interruption. This lead is passed through the first current sensor causing a measuring signal to be produced at once in the first current sensor, which corresponds to the differential current being measured. In this way there is no longer the need to ensure that two identical current sensors are used since only one current sensor is required.

In a third embodiment the idea was not to design the probe as a metal rod, but rather as a relatively thin metallically conductive spiral, which can be moved along as a wire in the conduit so that even very thin sewage pipes (house mains, etc.) can be examined.

To improve the probe's quality there is the possibility of attaching two spherical electrodes or other conductive bodies, connected in a conductive manner with the wire at intervals to each other on this spiral wire. In the space between the two electrodes, the two current sensors described above are again arranged, which work according to the previously described principle. There is therefore no need of a metal rod of a length, say, of one meter, but instead a continuous spiral can be used, its range being defined by the probe.

In a fourth embodiment of the prior art the idea was that a stationary wire should be stretched in the pipe being examined which, instead of moving, has a movable probe attached to it. A voltage is then applied to the wire, and on this wire is then moved the probe which consists of the two current sensors referred to above, which are arranged at a distance from each other and are kept at a distance through appropriate rods. These rods are insulating.

The arrangement of the two current sensors at a distance from each other ensures that the two current sensors only record the section of the wire found between the two current sensors as the measured distance.

In another embodiment the equalized potential of the three probe sections, unavoidable with the metal rod with mechanical and electrical separation, can be produced by an active control switch. In this instance the current emitted through the central probe section could then be simply measured directly.

A disadvantage of the familiar measuring probe is that only an inadequate resolution of the measurement is given of the sewage pipe because the familiar measuring probe takes the measurement on one full circle of the pipe and accordingly fails to produce an exact measurement because the pipe wall can only be recorded as a totality. If a leak is present in the pipe wall, then a fault current of the measuring probe will flow through this leak. Overlying this fault current is the total leakage current extending over the circumference of the pipe along the pipe wall and thereby falsifying the measurement finding. This is the reason why, with the familiar measuring probe, there is the disadvantage that faults are hard to recognize because the leakage current extending along the pipe wall is relatively large compared to the fault current actually being recorded, and therefore the measurement is difficult to analyze.

There is also the further disadvantage that a location of the leak (above/below, on the side) is not possible because the measuring probe revealed in the publication referred to does not take a radial reading, but only an axial reading. Thus the false location of the leak in the pipe wall cannot be precisely determined from the circumference.

SUMMARY OF THE INVENTION

It is therefore a primary purpose of the present invention to develop a measuring probe of the general type originally specified in such a way that much greater resolution is possible with readings and that a precise location of the leak can be obtained over the circumference of the pipe being measured.

An important feature of the invention is that now the central electrode is segmented, namely in radially equidistant, galvanically connected segments, wherein each individual segment carries out a quasi scanning-type measurement of the current. This has the fundamental advantage that the currents of the individual segments can be scanned over the circumference of the measuring probe so that a longitudinal siting of the leak becomes possible for the first time from the circumference of the pipe wall.

At the same time, there is the added substantial advantage that the leakage current is now fundamentally smaller since only the leakage current for each measured segment is considered, the leakage current over the circumference of the remaining segments along the pipe wall no longer playing any part. Such segmentation of the central electrode brings with it a reduction in the leakage current per segment, inversely proportional to the number of segments. This causes the aforementioned signal-to-noise ratio to increase proportional to the number of segments as well as also causing the effective leakage current per segment to become small in comparison to the known fault current occurring for one path through the pipe wall.

The segmentation of the central electrode generally allows the leakage current emitted from the central electrode to be distributed over the individual segments. However, this does not apply to the leakage current caused by a radially concentrated leak.

BRIEF DESCRIPTION OF THE DRAWING

The objects, advantages, and features of the invention will be more readily perceived from the following detailed description, when read in conjunction with accompanying drawing, in which:

FIG. 2 is a sectional view of the central section of the probe, taken along cutting plane II—II of FIG. 3;

FIG. 3 is a side view of the probe in the area of the central section; and

DETAILED DESCRIPTION OF THE PREFERRED EMBODIMENTS

Figure 1:
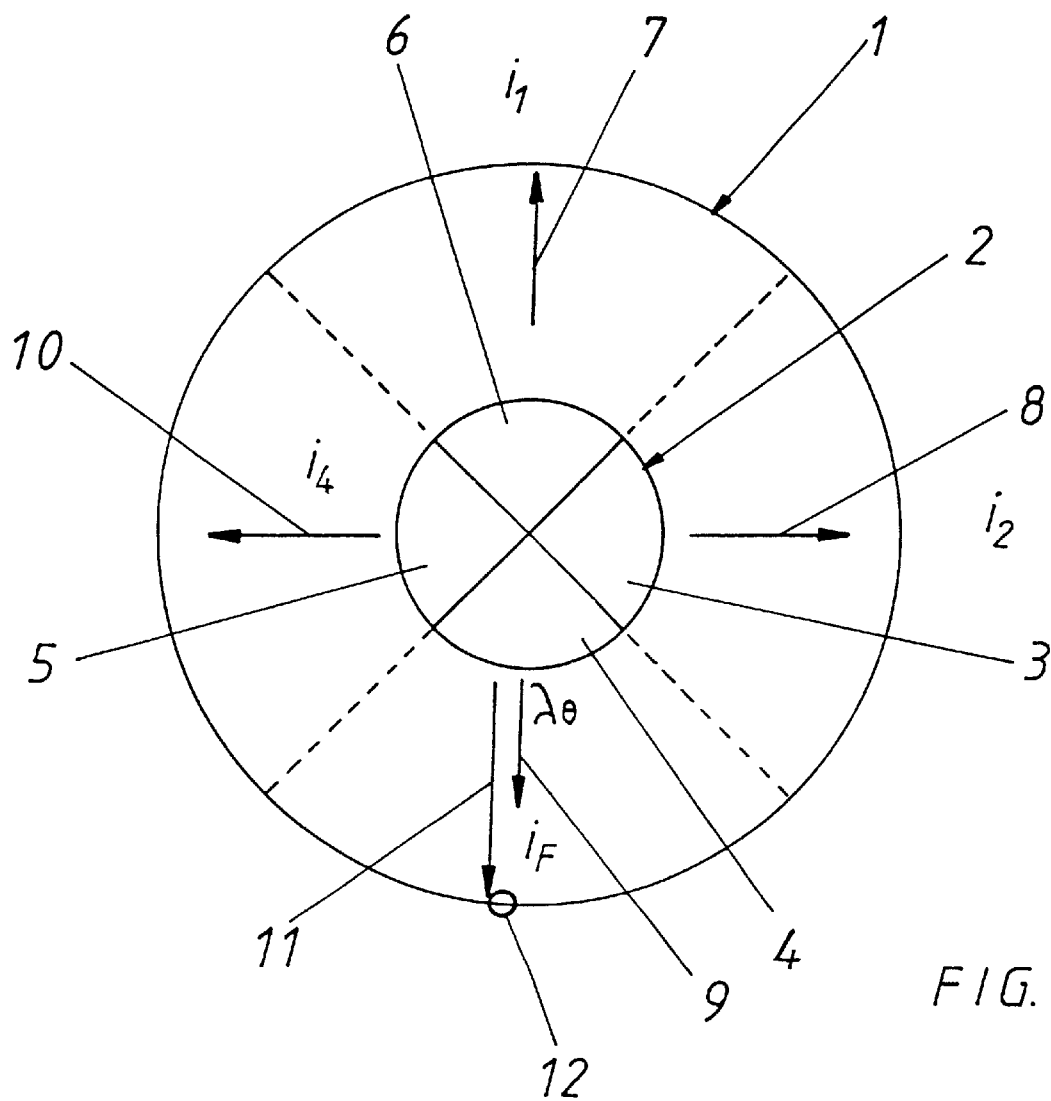
FIG. 1 is a sectional schematic of a sewage pipe with a probe.

In FIG. 1, in sewage pipe 1 probe 2 is guided in a longitudinal direction. FIG. 1 merely indicates in a schematic form that the central section of the probe consists of electrodes arranged in segments, which are hereafter referred to as segments 3–6.

Segments 3–6 are all at the same potential and are supplied from the same source. From each segment 3–6 a corresponding leakage current 7–10 flows radially in the direction of the pipe wall. The leakage currents 7–10 produce in sum through the individual segments the overall leakage current obtained over the circumference of the pipe wall.

What is important here is that leakage currents 7–10 are now substantially smaller than with the known state of the art so far, because each individual leakage current only represents a fraction of the overall leakage current and is inversely proportional to the number of existing segments 3–6.

The number of the segments is open, that is, not necessarily limited as shown in the embodiment example, to four segments 3–7. In practical usage, in fact, a much higher number of segments is used, such as eight or more. Hence the invention concerns a minimum number of segments of at least two.

In the wall of sewage pipe 1, a leak 12 is assumed to be present in the floor of the pipe, represented in the drawing at the bottom-most point of the sewage pipe. It can be seen from the drawing that overlying leakage current 9 is fault current 11, which is largely generated by segment 4. The other segments 3, 5 and 6 contribute practically nothing to generating this fault current.

Equally important is, in the present embodiment example leakage current 9 no longer overlies fault current 11 because, in accordance with the segmentation, it is smaller than the total leakage current. This measuring system is especially advantageous if the leakage current is relatively large beyond the wall of the sewage pipe. This is where the advantages of the segmented central electrode come into play, as described with the aid of FIG. 1.

By measuring the particular fault currents in the individual segments 3–6, it is possible to ascertain the location of leak 12 on the pipe floor, precisely because—as described above—the other segments 3, 5 and 6 practically generate no fault current 11.

The embodiment example depicted shows that the probe is drawn centrally in the longitudinal axis of the sewage pipe on a carriage and is therefore guided centrally in the sewage pipe in a longitudinal direction. The invention is not restricted to this arrangement, however, since it is also possible in another embodiment for the probe to be conducted in a decentralized manner along the pipe.

What is important here is that assigning the particular segment 3–6 in relation to the concrete position of probe 2 in the pipe also needs to occur. The preference is for using an angle decoder which establishes the orientation of the probe (turning position) in sewage pipe 1. In this way it is possible to tell, for instance, that when measuring a fault current in segment 4 a fault in the wall of sewage pipe 1 needs to be present at the position of the lowest point on the pipe floor.

Instead of using an angle decoder, precautions may also be taken to prevent probe 2 from rotating in sewage pipe 1. Securing the probe in a radial position might be necessary to prevent the probe from rotating in an undesirable way in the sewage pipe. If this kind of radial fixing is possible, then the angle decoder become superfluous and an automatic assignment of the particular segment 4–6 to the respective wall position of sewage pipe 1 is given.

Thus the fault location is safely assigned each time to the segment.

FIG. 2 represents a sectional view of the central section of probe 2, namely central section 13 (see FIG. 3). In FIG. 3 only part of this probe is depicted, namely main central section 13. The probe continues to the left and right through the appropriately long body sections of probe 14, which are metallic in design and at the same potential as individually segmented electrodes 27. The two body sections 14 are galvanically connected with each other and then galvanically connected in turn with the individual electrodes 27.

Instead of the galvanic connection envisaged, another design variant is possible where the parts (electrodes 27 and probe body sections 14) are at the same potential. The equalized potential is achieved by corresponding electronic circuitry.

Central section 13 is fundamentally defined by a more or less circular insulating body 15, which has two spaced side frames 17, 18 interconnected through bridges 16 and in the form of rings which run parallel to each other and are self-enclosing all the way around. To the left and right on the circular-shaped side frames 17, 18 are molded shoulders 30, which are tubular in shape and made from a single material. These shoulders serve to fix the entire insulating body 15 of probe 2.

The so-called guard electrodes consist in addition of tubular-shaped metal body sections (probe body sections 14) which, as tubes open on one side, have been slid from left and right respectively onto shoulders 30 of insulating body 15, made from insulating material. The outer circumference of body sections 14 is more or less flush with the outer circumference of side frames 17, 18. Centrally, the insulating body 15 has a radial area with a reduced diameter, in which the corresponding electrodes 27 are arranged.

Figure 4:
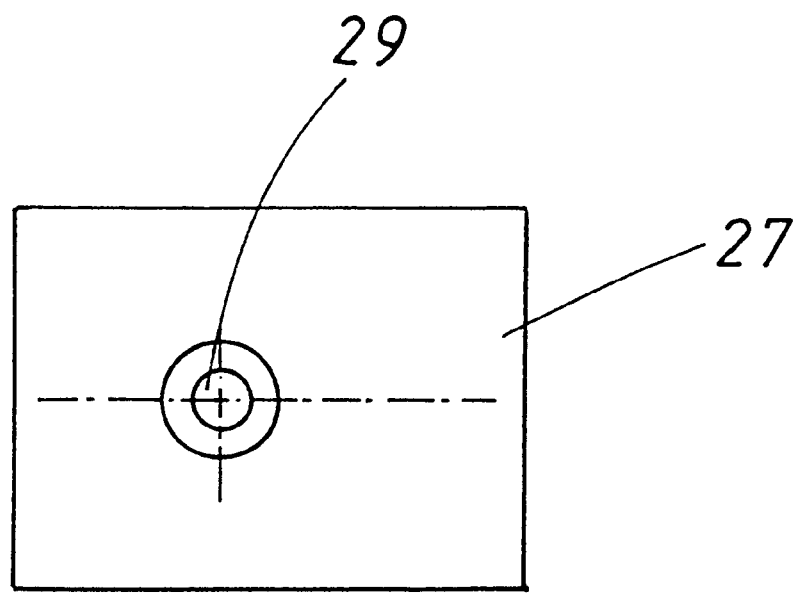
FIG. 4 is a top view of an electrode embodiment.

In this connection a series of recesses 19, evenly distributed over the circumference, are provided (see FIG. 2), which meet insulating body 15 in mounting surfaces 24, which are roughly level and discoid in structure. Mounting surfaces 24 are part of electrode mount 23 of insulating body 15. It is inside the area of these recesses 19 that individual discoid electrodes 27 (see FIG. 4) are fastened. The preferred method of fastening is by means of a threaded bolt (not illustrated here) penetrating bore hole 29 in electrode 27 and being screwed into tapped hole 25 of electrode mount 23.

On the other side, cable ducts 26 for carrying the wiring extend with a uniform circumference from central hollow area 28 in the direction of electrode discs 27. Each electrode disc 27 is connected to an assigned signal cable. In FIG. 2, for example, a single electrode disc 27 is depicted in a typical recess 19. It can be seen from this that the electrode disc is quite flat and level in design. Clearly a series of similar recesses 20, 21 are evenly distributed over the circumference. In each recess a similar electrode 27 (not identified elsewhere) is arranged. Electrodes 27 more or less fill up the recess, as is clear from the recess 20 in FIG. 3. The invention is not limited to level, discoid electrodes 27.

In another design the electrodes may be somewhat circular in design on their surface so as to be flush with external circumference 31 of the whole probe.

The invention is not limited to individual electrodes 27 being equidistant from central longitudinal axis 32. They could also be arranged eccentrically to the central longitudinal axis.

Another design variant of the invention envisages the electrodes not being arranged evenly over the circumference, but rather being found in a greater number in a particular area of the circumference where an increased occurrence of leaks is to be expected compared with surface areas of the sewage pipe where the occurrence of leaks is not to be anticipated with the same frequency.

Ultimately the individual electrodes 27 of probe 2 can be of various sizes, that is, in the area of the probe which sounds out the lower half of a sewage pipe 1 when seen as a cross-section, for example, it is possible to design the electrodes to have greater surface areas compared with the electrodes probing the top half of the sewage pipe viewed in this way.

The advantage of the present invention is that, because of the division of the central electrode into several radially arranged electrodes, a fundamentally more precise location of a defect in a sewer pipe has been made possible through the deliberate arrangement and dimensional design of the relevant electrodes.

In view of the above description it is likely that modifications and improvements will occur to those skilled in the relevant technical field which are within the scope of the accompanying claims. The invention is to be limited only by the appended claims, considering their spirit and scope, and equivalents.

What is claimed is:

1. A method for determining the location and scale of leaks in sewers and similar conduit systems formed by a network having at least one sewage pipe for carrying a sewage medium, wherein the pipes are not too highly conductive electrically and the medium flowing through them is more highly electrically conductive, the method comprising:

positioning an electrical measuring probe having a plurality of probe sections, each with an electrical potential, at a variable location in the sewage pipe;

applying a voltage to the measuring probe;

measuring a leakage current emitted by a central section of said measuring probe with several probe sections at a same potential said probe sections being arranged to provide a smaller overlay of the leakage current; and dividing the measured leakage currents of the central measuring probe into a number of at least two measuring electrode segments to determine both an axial and a radial location of a defect in the sewage pipe where the scale of said leaks is indicated by being proportional to a signal level of said measured leakage currents for signal levels that are small compared to a known fault current for said sewage pipe.

2. The method according to claim 1, wherein the level of the individual leakage current is considerably smaller than the level of the fault current due to the division of the leakage current into several individual leakage currents, which makes for a less interference-prone method of measurement for unequivocally determining the leaks that are assigned radially to the respective measuring electrode segment.

3. The method according to claim 1 or 2, wherein the several probe sections comprise individual radial segments, and further comprising employing an angle position according to radius encoder which enables the individual radial segments of the central electrode to be assigned an absolute position in the sewage pipe and thereby allows the damage to the sewage pipe to be located radially.

4. The method according to claim 1 or 2, and further comprising carrying out a quasi scanning-type measurement of the current for each radial segment of the central electrode.

5. The method according to claim 3, and further comprising carrying out a quasi scanning-type measurement of the current for each radial segment of the central electrode.

6. The method according to claim 1 or 2, and further comprising increasing the number of measuring segments to more than two wherein the signal-to-noise ratio between the leakage current and the fault current, when there is a leak, increases proportionally to the number of segments when measuring the leaks and thereby a more interference-free signal of the fault current being measured is achieved on account of a smaller overlay of the leakage current, since the level of the leakage current is now only of little importance compared to the level of the fault current.

7. The method according to claim 3, and further comprising increasing the number of measuring segments to more than two wherein the signal-to-noise ratio between the leakage current and the fault current, when there is a leak, increases proportionally to the number of segments when measuring the leaks and thereby a more interference-free signal of the fault current being measured is achieved on account of the smaller overlay of the leakage current, since the level of the leakage current is now only of little importance compared to the level of the fault current.

8. The method according to claim 4, and further comprising increasing the number of measuring segments to more than two wherein the signal-to-noise ratio between the leakage current and the fault current, when there is a leak, increases proportionally to the number of segments when measuring the leaks and thereby a more interference-free signal of the fault current being measured is achieved on account of the smaller overlay of the leakage current, since the level of the leakage current is now only of little importance compared to the level of the fault current.

9. The method according to claim 5, and further comprising increasing the number of measuring segments to more than two wherein the signal-to-noise ratio between the leakage current and the fault current, when there is a leak, increases proportionally to the number of segments when measuring the leaks and thereby a more interference-free signal of the fault current being measured is achieved on account of the smaller overlay of the leakage current, since the level of the leakage current is now only of little importance compared to the level of the fault current.

10. The method according to claim 6, and further comprising increasing the number of measuring segments to more than two wherein the signal-to-noise ratio between the leakage current and the fault current, when there is a leak, increases proportionally to the number of segments when measuring the leaks and thereby a more interference-free signal of the fault current being measured is achieved on account of the smaller overlay of the leakage current, since the level of the leakage current is now only of little importance compared to the level of the fault current.

11. A device for determining the location and scale of leaks in sewers and similar conduit systems formed by a network having at least one sewage pipe for carrying a sewage medium, wherein the pipes are not too highly conductive electrically and the medium flowing through them is more highly electrically conductive, said device comprising:

a electrical measuring probe comprising a probe body with a central section in place between a front and a rear end, said central section having a plurality of probe segments, each with an electrical potential, said measuring probe being positioned at a variable location in the sewage pipe;

said central section of said probe body being segmented radially and fitted with at least two electrodes, each said electrode being linked to a set of two or more electrical current flow sensors.

12. The device according to claim 11, wherein said segments on which said electrodes are mounted are evenly distributed over the circumference of said probe.

13. The device according to claim 11, wherein said segments on which said electrodes are mounted are shaped and configured so that they are arranged in a greater number in a particular area of the circumference of said probe than in the remaining area of the circumference of said probe.

14. The device according to claim 11 or 12, wherein said probe body is metallically conductive at its front and rear ends, additional to the central section of said probe.

15. The device according to claim 13, wherein said probe body is metallically conductive at its front and rear ends, additional to the central section of said probe.

16. The device according to claim 14, wherein said electrodes of said central section and said front and rear metallically conductive ends of said probe body are at the same potential and galvanically connected with each other.

17. The device according to claim 15, wherein said electrodes of said central section and said front and rear metallically conductive ends of said probe body are at the same potential and galvanically connected with each other.

18. The device according to claim 14, wherein said electrodes of said central section and said front and rear metallically conductive ends of said probe body are at the same potential, with the equalized potential being achieved by corresponding electronic circuitry.

19. The device according to claim 15, wherein said electrodes of said central section and said front and rear metallically conductive ends of said probe body are at the same potential, with the equalized potential being achieved by corresponding electronic circuitry.

20. The device according to claim 16, wherein said electrodes of said central section and said front and rear metallically conductive ends of said probe body are at the same potential, with the equalized potential being achieved by corresponding electronic circuitry.

21. The device according to claim 17, wherein said electrodes of said central section and said front and rear metallically conductive ends of said probe body are at the same potential, with the equalized potential being achieved by corresponding electronic circuitry.

22. The device according to claim 14, wherein said front and rear metallically conductive ends of said probe are guard electrodes, constructed as tubular metal bodies.

23. The device according to claim 16, wherein said front and rear metallically conductive ends of said probe are guard electrodes, constructed as tubular metal bodies.

24. The device according to one of claims 11–13, wherein said electrodes are shaped and configured to be discoid and flat and individually connected by their own respective signal cable.

* * * * *